Feb. 7, 1928.

E. P. SHELDON 1,658,466

MEANS FOR TRIMMING MAGAZINE SIGNATURES

Filed Jan. 14, 1926 4 Sheets-Sheet 1

INVENTOR
Edward P Sheldon
Philip Sawyer Rice Kennedy
ATTYS.

Feb. 7, 1928.

E. P. SHELDON 1,658,466

MEANS FOR TRIMMING MAGAZINE SIGNATURES

Filed Jan. 14, 1926     4 Sheets-Sheet 4

INVENTOR
Edward P Sheldon

Att'ys

Patented Feb. 7, 1928.

1,658,466

UNITED STATES PATENT OFFICE.

EDWARD P. SHELDON, OF BROOKLYN, NEW YORK, ASSIGNOR TO R. HOE & CO., INC., OF NEW YORK, N. Y., A CORPORATION OF NEW YORK.

MEANS FOR TRIMMING MAGAZINE SIGNATURES.

Application filed January 14, 1926. Serial No. 81,352.

This invention relates to certain improvements in machines for producing a folded product and for trimming a product on its ends and on the side opposite the fold line.

In the production of certain products, such as magazines, pamphlets and the like, comprising a large number of plies for the making up of what may be called a single product or signature, the product is usually secured together by stapling, or other suitable agencies, and folded, the product being trimmed on its ends and on its side opposite the fold line after it has been folded. It has been proposed to forward these products past a trimming mechanism, the product having its ends trimmed by end trimmers while it is being forwarded past the trimmers, and then being further forwarded against stops and having the edge opposite the fold line trimmed while in stopped position. With this construction, it frequently happens, particularly with thick products, that there is a tendency of the sheets making up the product to creep under the action of the cutters, so that an uneven end trimming of the product results and a product is produced which is undesirable.

It is a special object of the present invention to provide a mechanism in which a folded product is forwarded to an end trimming mechanism, stopped, and clamped in position so that the sheets are prevented from creeping and end trimmed while stopped, so that an even trimming of the ends of the product is assured.

A further object of the invention is to provide a mechanism in which the product may be forwarded to the trimming mechanism and delivered after being trimmed, or may be delivered in an untrimmed condition if desired.

A further object of the invention is to provide a mechanism for end trimming a folded product and for trimming the edge of the product opposite the fold line, these mechanisms being located closely adjacent and operated from the same power shaft so as to provide a compact structure and one in which the product path is made as short as practicable, thereby economizing in space.

With these and other objects not specifically referred to, the invention consists in certain novel parts, arrangements and combinations which will be described in connection with the accompanying drawings and the novel features pointed out in the claims hereunto annexed.

In the accompanying drawings, which show one preferred embodiment of the invention,—

Figure 2:
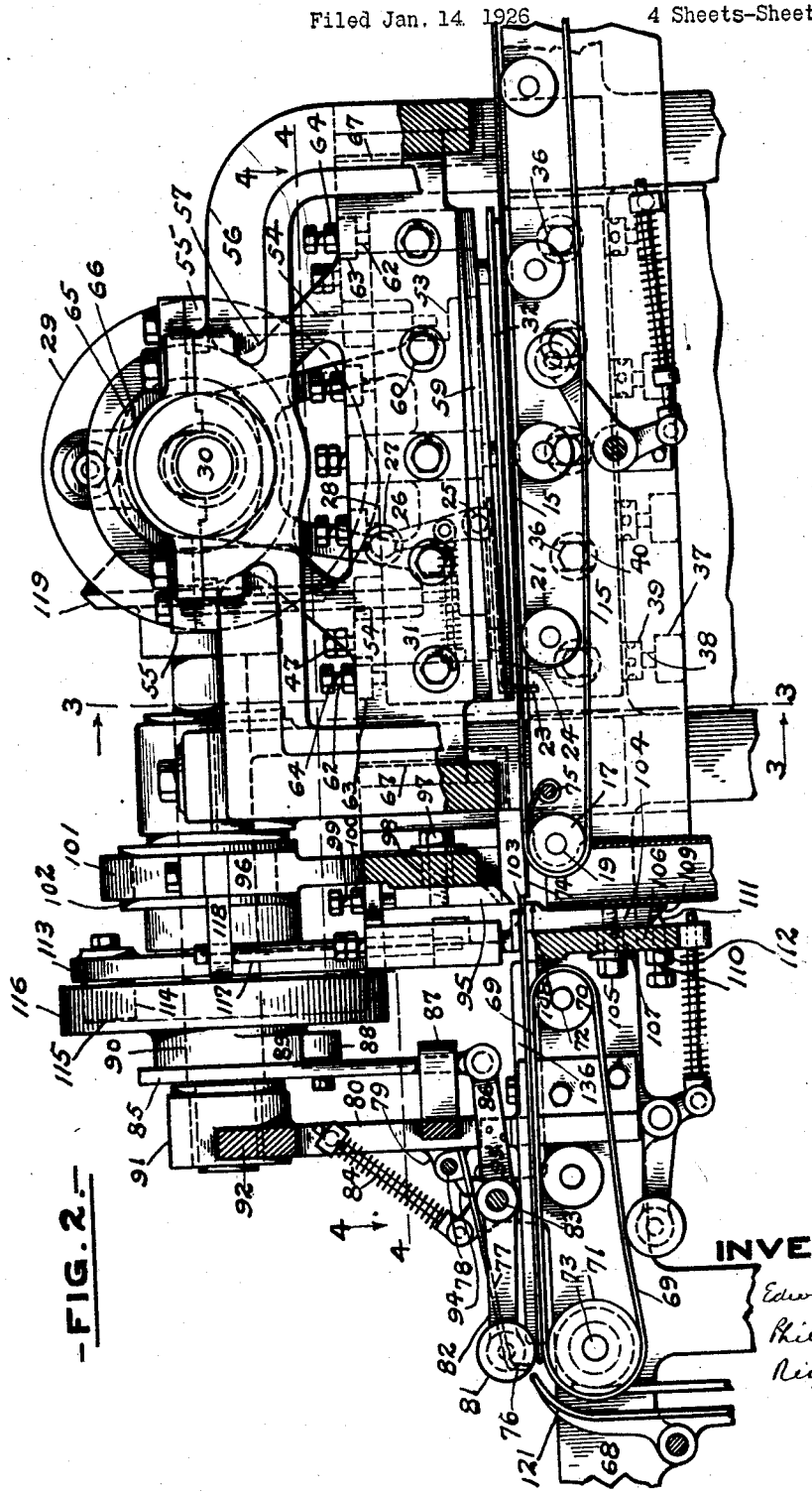
Figure 2 is a similar view, on an enlarged scale, of part of the construction shown in Fig. 1, certain parts being broken away to show the construction and certain other parts being in section.
Figure 3:
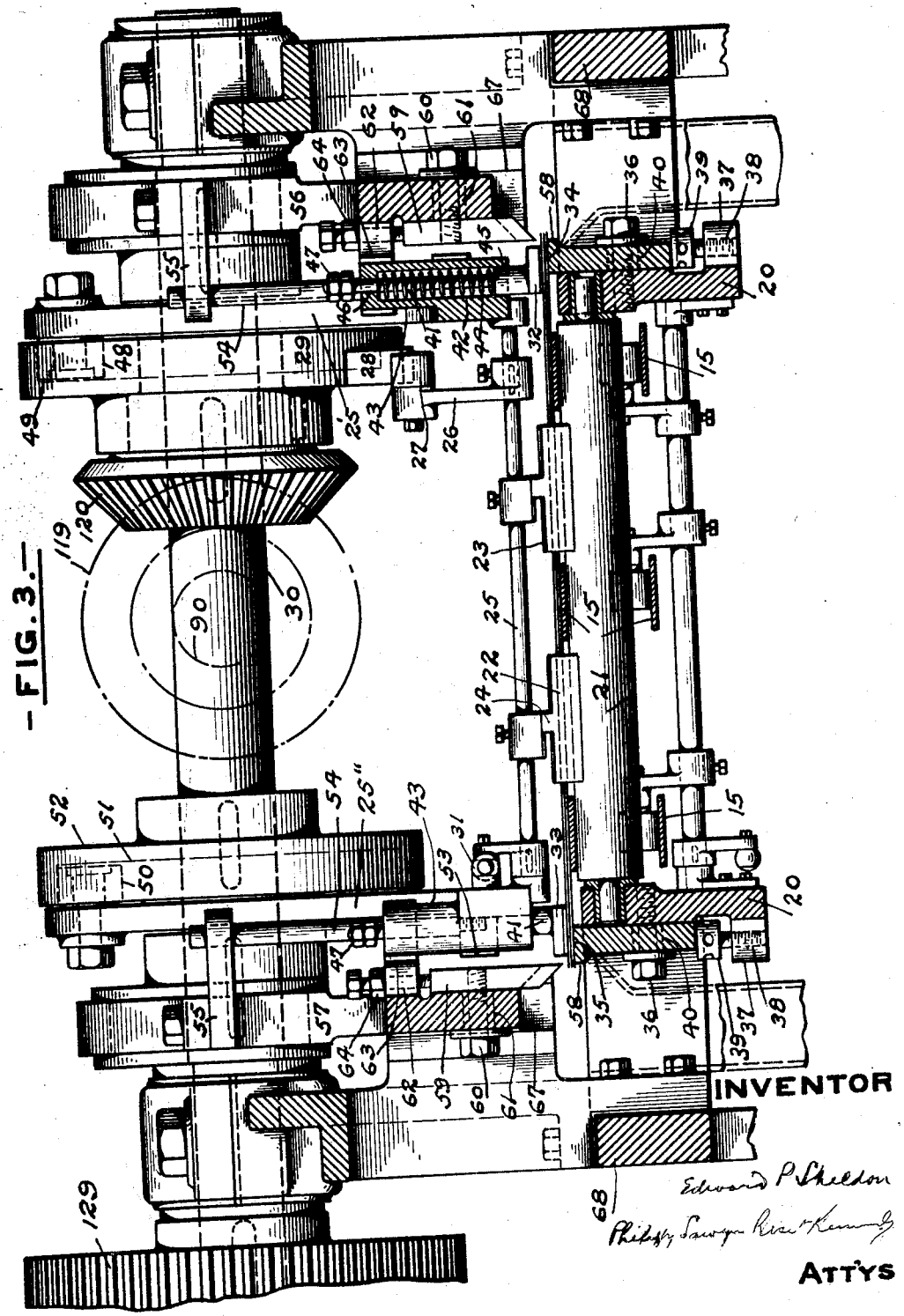
Figure 4:
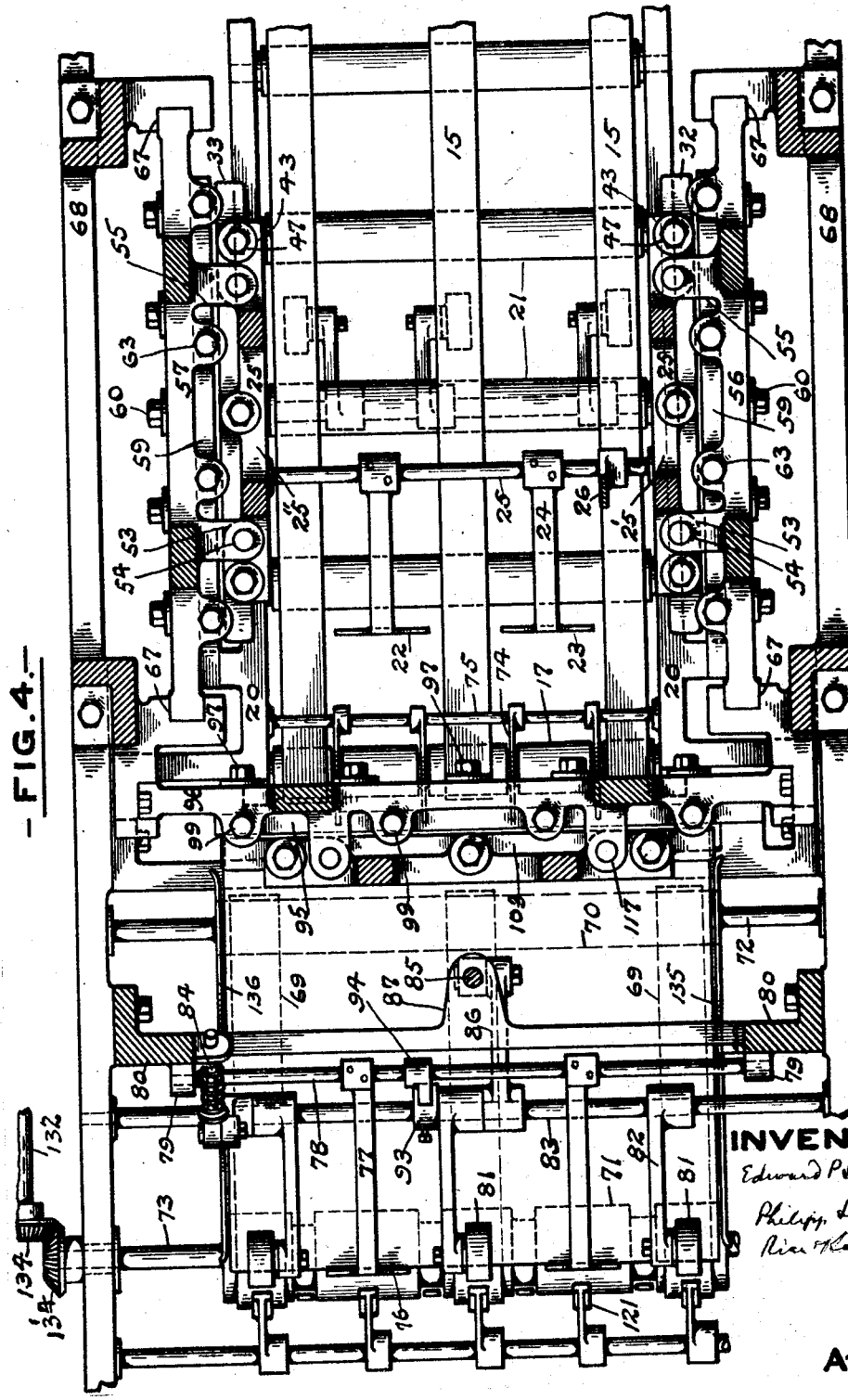

Figure 3 is a side view, partly in section, the view being taken on line 3—3 of Fig. 2 looking in the direction of arrow 3 of that figure, and Figure 4 is a plan view taken on the irregular line 4—4 of Fig. 2 looking in the direction of the arrow 4 of that figure.

Referring now to these drawings, the improved folding and cutting mechanism may be used at the delivery or folder end of a printing machine, not shown, or may be used for folding and trimming products from any desired source. Wherever the products come from, means will be provided for forwarding them in a flat form to a folding mechanism, shown in the form of a chopping blade folder 1, operated from an arm 2 on a shaft 3 suitably supported and operated in the machine. The products are forwarded to this folder in any suitable manner, as by being carried between upper and lower sets of tapes 4, 5 running over suitable pulleys 6. Cooperating with the folder blade 1 is a pair of folding-off rolls 7, 8 mounted on shafts 9, 10 suitably supported in the machine.

From these rolls the product is forwarded between guides 11, 12. One of these guides, as the guide 12, is a switch, by the manipulation of which the product may be forwarded to the trimming mechanism hereinafter referred to, or forwarded in untrimmed condition to a delivery, shown as an ordinary fan delivery 13, from which the product is delivered in any suitable manner, as by tapes 14.

Where the product is to be trimmed, it is forwarded to the trimming mechanism, which forms an important feature of the present invention. While this forwarding mechanism may be of any suitable kind, it is shown in the form of a set of tapes 15 which pass over pulleys 16, 17 on shafts 18, 19 suitably supported in the framing 20 of the machine. One of these shafts, as the shaft 18, is a driven shaft, being driven from connections hereinafter referred to. Suitable supporting rolls 21 are or may be provided for supporting the tapes, these being in any desired number.

In accordance with the invention, means are provided for stopping the product and for end trimming the product while it is stopped, and in the best constructions the product will be clamped while it is stopped, so that any tendency of the sheets to creep is prevented and an even trimming of the product is assured. The means for effecting these results may, of course, be varied within wide limits. In the particular construction illustrated, however, see Figs. 2 and 3, the product is forwarded folded edge first against a pair of stops 22, 23 carried on arms 24 secured to a rock shaft 25 suitably supported in frames 25', 25", again referred to. This shaft is operated to move the stops out of the way of the product path in any suitable manner. As shown, the shaft has fast thereon an arm 26 which carries a cam roll 27 which is actuated by a cam surface 28 on an operating cam 29 supported on an operating shaft 30, the arm 26 being preferably rocked against a spring 31, see Fig. 2, this spring normally holding the stops in up position out of the path of the product.

In machines embodying the invention in its best form and as shown, means are provided for clamping the end edges of the product while the product is being trimmed so that no creeping of the sheets or plies of the products can take place. In the particular construction shown, therefore, there is provided a pair of clamp bars 32, 33 which extend the length of the product at each side thereof. These clamp bars cooperate with suitable abutment plates 34, 35 which are secured to the frames 20, before referred to, by bolts 36. These abutment plates may have a limited adjustment, if desired, toward and from the clamps. In the particular construction shown for effecting this, the frames 20 are provided with lugs 37 into which are tapped thrust screws 38 provided with operating heads 39 by which they can be turned, through the medium of a suitable tool, these thrust screws bearing against the lower edges of the abutment plates 34, 35. To permit this adjustment, the plates are provided with slots 40 through which the bolts 36 pass. The clamp plates 32, 33 are, in the best constructions, spring seated and are intermittently operated to clamp and release the products. As shown, the clamp plates 32, 33 are supported from rods 41 which are located in recesses 42 in blocks 43 formed on the frames 25', 25", before referred to. Springs 44 surround the rods and seat against abutments 45 on the rods and the closed ends 46 of the recesses. The rods, at their upper ends, pass through the tops 46 and are provided with adjusting nuts 47.

It will be observed that by operating the frames 25', 25" vertically the clamps will be lifted out of engagement with the product and returned to engagement therewith, the clamps being held firmly in engagement by the springs.

These frames are provided on each side of the machine and are operated simultaneously so as to free both clamps at the same time. While various means may be effected for doing this, in the particular construction shown the frame 25' is provided with a cam roll 48 which rides in an internal groove 49 of the cam 29, before referred to, and the frame 25", which operates the clamp 33, is provided with a cam roll 50 which operates in an internal cam groove 51 of a cam 52 on the shaft 30, before referred to.

In the best constructions, means are provided for supporting and guiding frames 25', 25" in their reciprocating movements. In the particular construction illustrated, the frames are provided with lugs 53 in which are screwed guide rods 54, these guide rods working through openings in brackets 55 which are secured on frames 56, 57, hereinafter referred to. With this construction the products are held firmly clamped and while they are clamped their ends are trimmed. The trimming mechanism for trimming the ends of the products may vary widely in construction, but in the best constructions this cutting mechanism will include a pair of reciprocating knives operating to produce a shear cut, these knives cutting against ledges 58 formed on the abutment plates 34, 35, before referred to. These knives are given a reciprocating or chopping movement in any suitable manner. In the particular construction shown, these knives, which are marked 59, are adjustably secured on the frames 56, 57, before referred to, by means of bolts 60, these bolts working in slots 61 in the frames and permitting a vertical adjustment of the knives. This adjustment is effected by means of adjusting screws 62 threaded into lugs 63 on the frames and provided with adjusting nuts 64.

Figure 1:
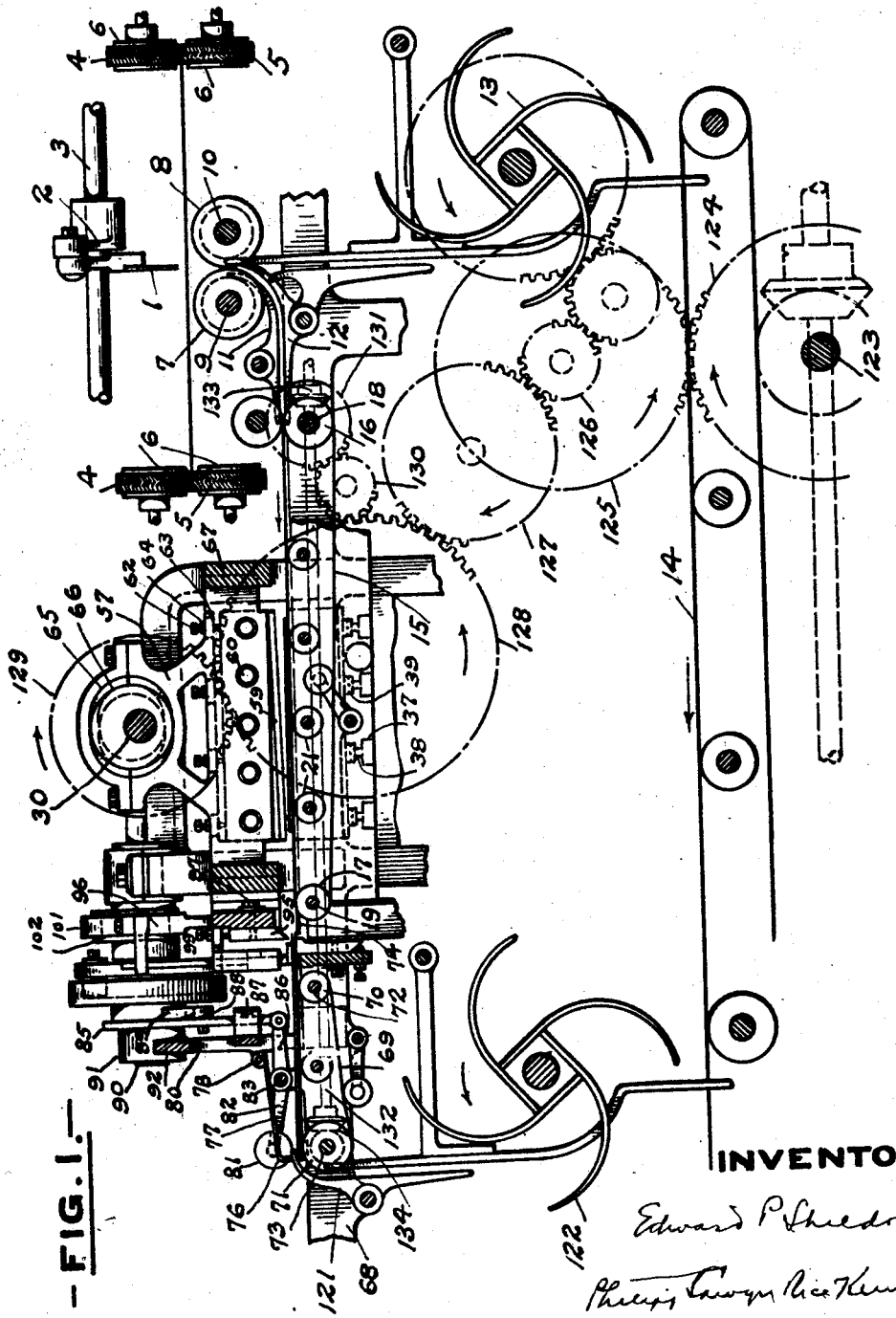
Figure 1 is an end elevation, partly broken away and partly in section, of the improved trimming mechanism and a folder.

The frames 56, 57 are, as shown, see particularly Fig. 1, reciprocating frames, being provided with an opening 65 in which works a cam 66 on the shaft 30, before referred to. The opening 65 is shaped so as to permit the cam to operate the frames in a vertical direction, but to prevent lateral or sidewise movement of the frames. These frames 56, 57 work in guideways 67 formed in the main side frames 68 of the machine.

With this construction, it will be clear that the ends of the product are given a clean even trim.

In accordance with the invention, means are provided for trimming the product on the edge opposite the fold line and, to effect a compact construction, these means are located closely adjacent the end trimming means described, these means being operated from the same shaft 30 by which the end trimming mechanisms are operated. While the specific structure of these edge trimming means may vary, in the particular construction illustrated they will include knives operating to produce a shear cut, clamps for clamping the product while it is being trimmed, and stops for stopping the product. In the particular construction illustrated, see Figs. 1, 3 and 4, the product is forwarded from the tapes 15 to a second set of tapes arranged closely adjacent thereto, marked 69, which pass over pulleys 70, 71, one of which is driven. These pulleys are carried on shafts 72, 73 suitably supported in the main frames 68, before referred to.

The tapes 15 and 69 are separated to permit of the operation of the cutting mechanism for cutting the edge of the product opposite the fold line, and in the best constructions means are provided for bridging this space to guide the product from the tapes 15 to the tapes 69. In the particular construction illustrated, these means include fingers 74 on a shaft 75 suitably supported in the side frames 20, before referred to, these fingers extending almost up to the path of the knife by which the edge of the product is trimmed.

The product is forwarded by the tapes 69 against stops 76 on arms 77 on a rock shaft 78 pivoted in brackets 79 in a frame 80 secured to the main frames 68, before referred to. Likewise, there are preferably provided the usual drop rollers 81 carried on arms 82 on a rock shaft 83 suitably journalled in the frames 68, before referred to. This rock shaft 83 is backed up by the usual spring rod construction 84, see Figs. 2 and 4. This rock shaft 83 is operated by means of a cam yoke 85 which is connected at one end to an arm 86 fast on the rock shaft. This yoke is guided in its movement in a bracket 87 and carries a cam roll 88 operated by a cam 89 on a cross-shaft 90 which is supported in bearings 91 in framing 92 supported from the frame 80, before referred to.

The arms 77 are operated from the rock shaft by means of a cam nose 93 on the rock shaft 83 and a cooperating cam nose 94 on the rock shaft 78 to which the arms 77 are secured. With this construction, the drop rollers 81 and the stops 76 are suitably operated to stop and release the products.

In accordance with the invention, means are provided for trimming the edge of the product opposite the fold line, it being understood that the folded edge of the product is in advance as the product is forwarded against the stops 76. While these edge trimming means may be of various constructions, they will include clamping mechanism for clamping the product so as to insure an even trim and a mechanism for trimming the product while it is held by the clamps.

In the best constructions, these operating mechanisms are located closely adjacent the mechanism for trimming the ends of the product, hereinbefore described, and, for convenience, these means may be similar to those already described, and operated in a similar way from the shaft 30. In the particular construction shown, therefore, referring to Figs. 2 and 4, there is provided an edge trimming knife 95 adjustably secured to a frame 96 by bolts 97 having a slotted connection, indicated at 98, through the frame so as to permit this adjustment, the adjustment being effected by the usual adjusting screws 99 and adjusting nuts 100. This frame 96 and the frame 101 form a reciprocating framing like the reciprocating framing 56, 57, before referred to, and is operated by a cam 102 on the shaft 90, before referred to.

In accordance with the invention, a clamp similar to the clamp 32, before referred to, is employed for clamping the edge of the product while it is being trimmed. As shown, therefore, there is a clamp bar 103 which extends across the machine, this clamp bar cooperating with an abutment plate 104 which is secured by bolts 105 to a cross-frame 106, the bolts having a slotted connection with the frame by means of slots 107. This abutment plate 104 is provided with a projection or ledge 108 which cooperates with the edge trimming knife 95 to produce a clean shear cut. The abutment plate 104 may be adjusted in any suitable manner. As shown, the rear end of this plate is provided with a beveled face 109 which bears on an adjustment screw 110 having a beveled face 111, this screw being operated by the usual adjusting nuts 112.

The clamp bar 103 is spring seated like the clamp 32, before referred to, and as the construction is the same it need not be given in detail again. The clamp is carried from a frame 113 which is given a reciprocating movement by a cam roller 114 operating in the groove 115 of a cam 116 on the shaft 90. If desired, guide rods 117 may be provided like the guide rods 54, before referred to, these guide rods being secured in the frame 113, by which the clamp bar is operated, and in brackets 118 carried on the eccentric frame 96, before referred to.

In the best constructions and as shown, the parts are all operated from the shaft 30. While this may be done in various ways, as illustrated, the shaft 90, at one end, is provided with a miter gear 119 which is in mesh with a miter 120 on the shaft 30, before referred to, the parts being all operated from this one shaft.

The trimmed product may be delivered in any suitable manner. As shown, it is forwarded by the tapes 69 against a guide 121 by which it is directed to a fly delivery 122 from which it may be finally carried away by the tapes 14, before referred to. The various parts of the mechanism may be driven in any suitable manner from a power shaft 123 through a train of gears 124, 125, 126, 127, 128 to a gear 129 on the shaft 30. The pulley shaft 18 may be driven from the gear 128 by means of an intermediate gear 130 and a gear 131 on the pulley shaft, and the pulley shaft 73 may be driven from the shaft 18 by means of a longitudinal shaft 132 and gearing 133, 134 and 134'.

The operation of the machine is clear, it is believed, from the foregoing, but may be briefly recapitulated as follows:

Assuming the product is to be trimmed, the guide 12 is set to direct the product from the folding rolls 7, 8 to the tapes 15. The product is carried by these tapes against the stops 22, 23, where it is stopped. The clamps 32, 33 are then operated to clamp the product against the abutment plates 34, 35, and, after the clamps have operated, the end trimming knives 59 are operated to trim the edges of the product, whereupon the clamps are released, the front stops raised, and the product forwarded by the tapes 15 into the control of the tapes 69. These latter tapes bring the product against the stops 76, the positioning of the product being facilitated by side guides 135, 136. After the product has been stopped, the drop rollers are lowered and the clamp bar 103 is operated to clamp the product against the abutment 108. The trimming knife 95 is then actuated to trim the edge of the product opposite the fold, whereupon the clamps are released, the front stops 76 and the drop rollers 86 are lifted, and the product forwarded into the control of the guide 121.

With the construction shown and described it will be seen that a practical arrangement has been provided and one in which the product path from the folder to the trimming mechanism is short, so that space is economized and an accurate control of the product is obtained.

While the invention has been shown and described in a preferred embodiment, it will be understood that the constructions for carrying out the invention may be varied within considerable limits without departing from the invention as defined in the appended claims.

What I claim is:

1. The combination of a folding mechanism, means adjacent the folding mechanism for trimming the side edges of a product, means for stopping the product while the trimming mechanism is operated, and means for forwarding the products to the side trimming mechanism and away from the side trimming mechanism after the latter has operated.

2. The combination of a folding mechanism, means adjacent the folding mechanism for trimming the side edges of a product, means for stopping the product while the side trimming mechanism operates, means for clamping the product while the trimming mechanism operates, and means for forwarding the product to the side trimming mechanism and away from the side trimming mechanism after the latter has operated.

3. The combination of a folding mechanism, means adjacent the folding mechanism for trimming the side edges of a product, means adjacent the side trimming means for trimming the edge of the product opposite the fold line, means for stopping the product while the trimming means operate, and means for forwarding the product to the side trimming mechanism and away from the side trimming mechanism and to the edge trimming mechanism after the side trimming mechanism has operated.

4. The combination of a folding mechanism, means adjacent the folding mechanism for trimming the side edges of a product, means closely adjacent the side trimming means for trimming the edge of the product opposite the fold line, means for stopping the product while the side trimming mechanism operates, means for clamping the edges of the product while the trimming mechanisms operate, and means for forwarding the product to the side trimming mechanism and away from the side trimming mechanism and to the edge trimming mechanism after the side trimming mechanism has operated.

5. The combination of a folding mechanism, means for trimming the side edges of a product, a carrier for conveying the product from the folder to the trimming mechanism, and away from the trimming mechanism after the latter is operated, means for stopping the product while it is being side trimmed, a second carrier to which the product is delivered after its side edges are trimmed, and a trimming mechanism operating between the carriers for trimming the edge of the product opposite the fold line.

6. The combination of a folding mechanism, trimmers for trimming the side edges of a product, a carrier for conveying the product from the folder to the trimmers, means for stopping the product while it is being side trimmed, a second carrier to which the product is forwarded after its side edges are trimmed, a trimmer operating between the carriers for trimming the edge of the product opposite the fold line, and a guide between the carriers for guiding the product from one carrier to the other.

7. The combination of a folding mechanism, means for trimming the side edges of a product folded thereby, means for stopping the product while the trimming mechanism is operated, and means for forwarding the products from the folding mechanism to the side trimming mechanism and away from the side trimming mechanism after the latter has operated.

In testimony whereof, I have hereunto set my hand.

EDWARD P. SHELDON.